United States Patent [19]
Zilberman et al.

[11] Patent Number: 4,926,684
[45] Date of Patent: May 22, 1990

[54] APPARATUS FOR DISSIPATING SHOCK-WAVE ENERGY EXPERIENCED BY A TEST MODEL

[75] Inventors: Moshe Zilberman, Maccabim; Mordechai Livne, Ramat Hasharon; Doron Tchetchick, Tel Aviv; Moshe Daniel, Metar, all of Israel

[73] Assignee: Israel Aircraft Industries, Ltd., Israel

[21] Appl. No.: 354,160

[22] Filed: May 19, 1989

[30] Foreign Application Priority Data

May 23, 1988 [IL]   Israel ................................. 86471

[51] Int. Cl.$^5$ ............................................. G01M 9/00
[52] U.S. Cl. ........................................................ 73/147
[58] Field of Search ........................................... 73/147

[56] References Cited

U.S. PATENT DOCUMENTS 3,587,306  6/1971  Bryan ................................. 73/147

OTHER PUBLICATIONS

M. Zilberman and M. Livne, "Starting and Stopping Loads on a Cone Cylinder Model", Presented at the 63rd Semiannual STA Meeting, Apr. 15-16 1985, Dallas, Tex.

Primary Examiner—Donald O. Woodiel
Attorney, Agent, or Firm—Ladas & Parry

[57] ABSTRACT

Apparatus for dissipating shock-wave energy experienced by a test model having a base and being supported at a first location by a sting in a wind tunnel comprising apparatus movably mounted onto the sting for locking thereto at a second location the base portion of the test model and apparatus for selectably moving said apparatus for locking into and out of locking engagement with the test model and the sting.

7 Claims, 2 Drawing Sheets

APPARATUS FOR DISSIPATING SHOCK-WAVE ENERGY EXPERIENCED BY A TEST MODEL

FIELD OF THE INVENTION

The present invention relates, in general, to aerodynamic testing of models in wind tunnels and, in particular, to apparatus for reducing the effect on test apparatus of shock waves generated in wind tunnels.

BACKGROUND OF THE INVENTION

Wind tunnels are well known as a means of simulating aerodynamic forces experienced by airborne bodies such as aircraft and missiles. In general, wind tunnels comprise a support or 'sting', for a scaled down model of an airborne body that it is wished to study. The sting comprises an elongate member which at one end is tapered and which at the other, non-tapered end, is mounted onto a fixed support. The model is mounted onto the sting by insertion of the tapered end thereof deep into a bore provided within the body of the model. There is also provided, along a portion of the sting operative to be inserted and to engage the model, apparatus for measuring aerodynamic forces experienced thereby.

The measuring apparatus typically comprises a plurality of electrical strain gauges and apparatus for converting into forces electrical potential differences measured across the strain gauges. There is also provided apparatus for generating along the wind tunnel a high speed air flow, typically at supersonic speeds.

When a wind tunnel is in operation there exist two types of loading that are experienced by the model. One type of loading results from steady state operation of the wind tunnel at a substantially constant air flow speed. The other type of loading results from a shock wave generated at the starting and stopping phases of operation. It has been found that the shock wave causes a relatively high pressure difference across the model and so results in relatively high forces and moments thereon which may be as much as ten times the normal forces and moments generated under steady state conditions.

The very high forces and moments generated by the shock waves have been found to cause damage to the high resolution measuring apparatus preferred for use, which is generally of rather delicate construction.

One way of preventing the damage caused to the measuring apparatus by the shock waves is by using 'heavy duty' apparatus, although this provides less accurate measurements than the more delicate, high resolution apparatus.

Alternatively, it is known to lower the pressure used in the wind tunnel. Although this prevents damage to the high resolution measuring apparatus, it is wasteful of energy.

SUMMARY OF THE INVENTION

It is an aim of the present invention to provide apparatus for reducing the effect on a test model of shock waves generated in wind tunnels during transient operational phases thereof, namely, during the starting and stopping phases.

There is provided, therefore, in accordance with an embodiment of the invention, apparatus for dissipating shock-wave energy experienced by a test model having a base and being supported at a first location by a sting in a wind tunnel comprising apparatus movably mounted onto the sting for locking thereto at a second location the base portion of the test model and apparatus for selectably moving said apparatus for locking into and out of locking engagement with the test model and the sting.

Additionally in accordance with an embodiment of the invention, the apparatus for locking comprises a plug defining a central bore by means of which the plug is mounted onto the sting and a wedge portion for engaging the model and the sting by being inserted under pressure into a gap therebetween.

Further in accordance with an embodiment of the invention, the apparatus for selectably moving comprises a linear motion assembly comprising a base assembly mounted onto and secured in fixed relation thereto; and two extensible members lying parallel to a longitudinal axis of the sting, each extensible member having one end coupled to the plug and another end arranged for axial movement relative to the base assembly.

Additionally in accordance with an embodiment of the invention, the linear motion assembly comprises a hydraulic assembly, the base assembly comprising two hydraulic cylinders for mounting onto the sting in parallel alignment to the longitudinal axis thereof and each of the two extensible members comprising an hydraulic piston associated with one of the two cylinders and having a free end by which it is coupled to the plug.

Further in accordance with an embodiment of the invention, the apparatus is operable in either one of first or second modes, in the first mode the pistons being extended and the plug being retained under pressure in locking engagement with the model and the sting and in the second mode, the pistons and plug being in a retracted position relative to the model and the sting.

BRIEF DESCRIPTION OF THE DRAWINGS

The present invention will be more fully understood and appreciated from the following detailed description, taken in conjunction with the drawings, in which.

DETAILED DESCRIPTION OF A PREFERRED EMBODIMENT

Figure 1:
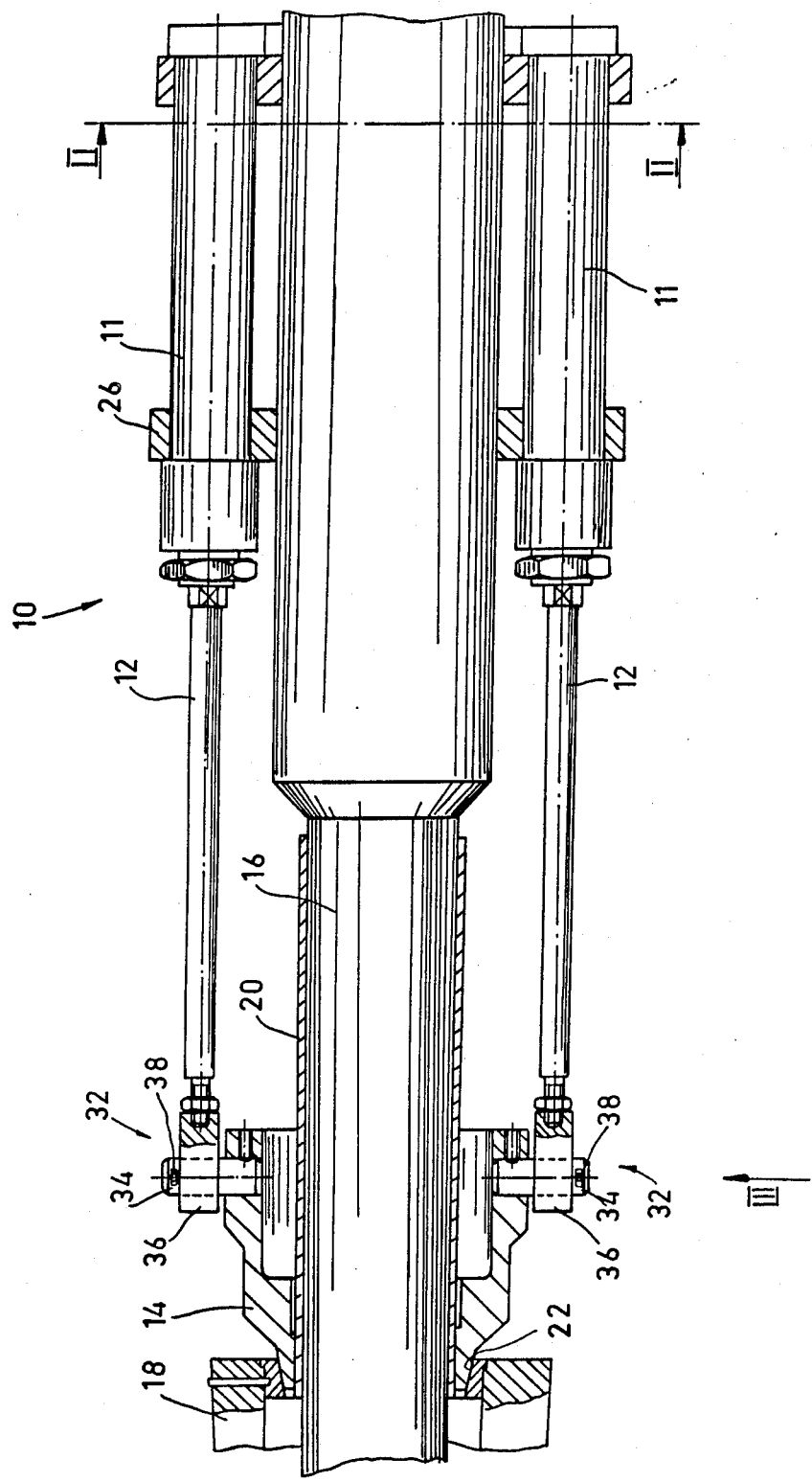
FIG. 1 is a partially cut-away top view of apparatus for dissipating shock-wave energy experienced by a test model in a wind tunnel, constructed and operative in accordance with a preferred embodiment of the present invention.
Figure 2:
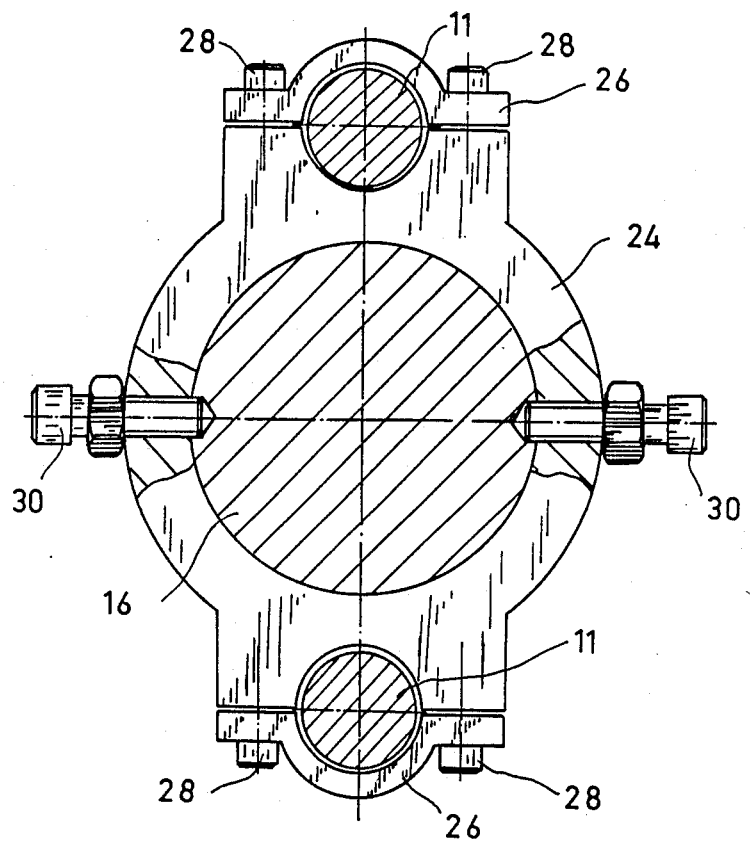
FIG. 2 is a cross-sectional view taken along line II—II in FIG. 1.
Figure 3:
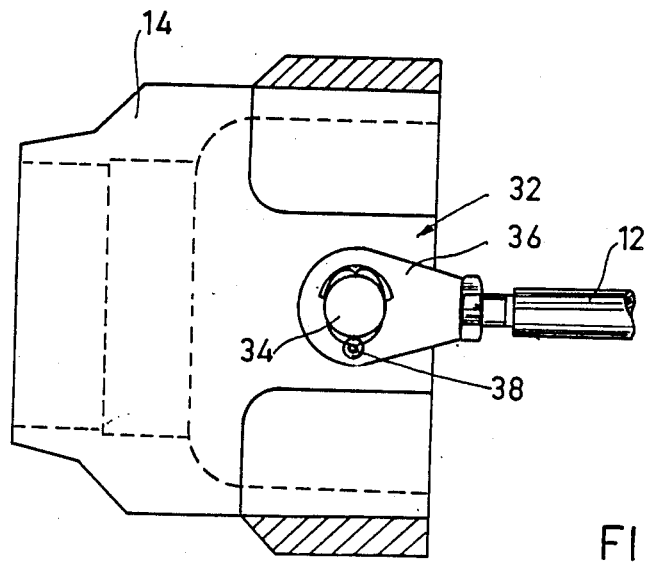
FIG. 3 is a view taken in the direction of arrow III in FIG. 1.

Reference is made to FIGS. 1 to 3, in which there is shown apparatus for dissipating shock-wave energy experienced by a test model in a wind tunnel. The apparatus comprises a linear motion assembly, referenced generally 10, which includes typically a pair of hydraulic cylinders 11 and their respective associated pistons 12. Coupled to the pistons is an annular plug 14 member arranged for axial sliding motion along a sting 16 on which there is supported a test model, a base portion 18 of which is shown in FIG. 1.

Plug 14 is operative to lock the model and the sting together so as to dissipate a relatively large proportion of the energy provided thereto upon passage of a shock wave therepast. According to the shown embodiment there is also provided a sleeve 20 which is mounted onto sting 16 and which provides a low-friction travel surface for plug 14.

When wind tunnels are used for testing models under conditions of air flow at supersonic speed, shock waves are generated in the start and stop phases. A very high pressure gradient is set up across the model as a result of the shock waves and moments are thus applied to the model that may be an order of magnitude more powerful than moments experienced by the model in steady state conditions.

Measuring apparatus (not shown) is provided on the sting along a length thereof that is inserted into an elongate bore within the model. The measuring apparatus, as known in the art, is capable of providing relatively high resolution measurements and typically comprises electrical strain gauges, normally of Wheatstone bridge construction. The different levels of electrical potential difference measured across the strain gauges in different positions on the sting are converted into loads and it is thus possible to generate a complete pattern of loading experienced by the model under known conditions of air flow.

The measuring apparatus described above is unable to withstand such high loads as are generated under shock wave conditions and generally becomes damaged when exposed thereto.

In operation, therefore, pistons 12 of the apparatus of the present invention are extended, by activating apparatus (not shown), such as solenoid valves, for pressurizing hydraulic cylinders 11. A typical range of pressure values is 50 to 150 PSI. As pistons 12 are extended, plug 14 is moved along sleeve 20 and a tapered portion 22 of plug 14 becomes inserted into a gap between the model and the sting.

As the plug is inserted under pressure into the gap, it constitutes a wedge between the model and the sting. When shock wave energy is applied to the sting, which normally supports the model adjacent its tapered end where the measuring apparatus is positioned, a large proportion of the energy is, therefore, conducted away from the measuring apparatus via plug 14, pistons 12 and cylinders 11. It has been found that up to 50% or more of the forces acting on a test model and generated by a shock wave can be dissipated by the apparatus of the present invention.

After the start-up shock wave has passed, plug 14 is retracted and measurement of loads on the model can be carried out. Prior to termination of the air flow through the wind tunnel, cylinders 11 are again pressurized and plug 14 is thus extended so as to lock together the model and the sting and the air flow may be terminated with little risk of damage to the measuring apparatus.

With particular reference to FIG. 2, it is seen that cylinders 11 are secured to a base portion of the sting by means of a cylindrical collar 24 and clamps 26 secured thereto and about the pistons as by screws 28. Collar 24 is secured to sting 16 also by means of screws, referenced 30.

Referring now to FIGS. 1 and 3, it is seen that yoke 14 is coupled to pistons 12 by connections 32, each providing a single degree of rotational freedom. Each of connections 32 typically comprises a pin 34 secured to plug 14, a harness 36 threadably secured to piston 12 and placed over pin 34 and a split retaining pin 38 passing through a transverse bore formed in pin 34.

According to alternative embodiments of the invention, linear motion assembly need not be hydraulic and it may comprise, for example, linear actuators.

It will be appreciated by persons skilled in the art that the present invention is not limited by what has been shown and described hereinabove. The scope of the invention is limited, rather, solely by the claims, which follow:

We claim:

1. Apparatus for dissipating shock-wave energy experienced by a test model having a base and being supported at a first location by a sting in a wind tunnel comprising:
   tapered means movably mounted onto the sting for locking thereto at a second location the base portion of the test model and
   means for selectably moving said means for locking into and out of locking engagement with the test model and the sting.

2. Apparatus according to claim 1, and wherein said means for locking comprises a plug defining:
   a central bore by means of which said plug is mounted onto the sting and
   a wedge portion for engaging the model and the sting by being inserted under pressure into a gap therebetween.

3. Apparatus according to claim 2, and wherein said means for selectably moving comprises a linear motion assembly comprising:
   a base assembly mounted onto the sting and secured in fixed relation thereto; and
   at least two extensible members lying parallel to a longitudinal axis of the sting, each extensible member having one end coupled to said plug and another end arranged for axial movement relative to the base assembly.

4. Apparatus according to claim 3, and wherein said linear motion assembly comprises a hydraulic assembly, said base assembly comprising at least two hydraulic cylinders for mounting onto the sting in parallel alignment to the longitudinal axis thereof and each of said at least two extensible members comprising an hydraulic piston associated with one of said at least two cylinders and having a free end by which it is coupled to said plug.

5. Apparatus according to claim 4, and wherein said apparatus is operable in either one of first or second modes, in the first mode said pistons being extended and said plug being retained under pressure in locking engagement with the model and the sting and in the second mode, said pistons and plug being in a retracted position relative to the model and the sting.

6. Apparatus according to claim 3, and wherein said apparatus is operable in either one of first or second modes, in the first mode said pistons being extended and said plug being retained under pressure in locking engagement with the model and the sting and in the second mode, said pistons and plug being in a retracted position relative to the model and the sting.

7. Apparatus according to claim 2, and wherein said apparatus is operable in either one of first or second modes, in the first mode said pistons being extended and said plug being retained under pressure in locking engagement with the model and the sting and in the second mode, said pistons and plug being in a retracted position relative to the model and the sting.

* * * * *